H. B. HARTMAN.
WATER PURIFYING APPARATUS.
APPLICATION FILED JUNE 11, 1914.
1,139,970.
Patented May 18, 1915.
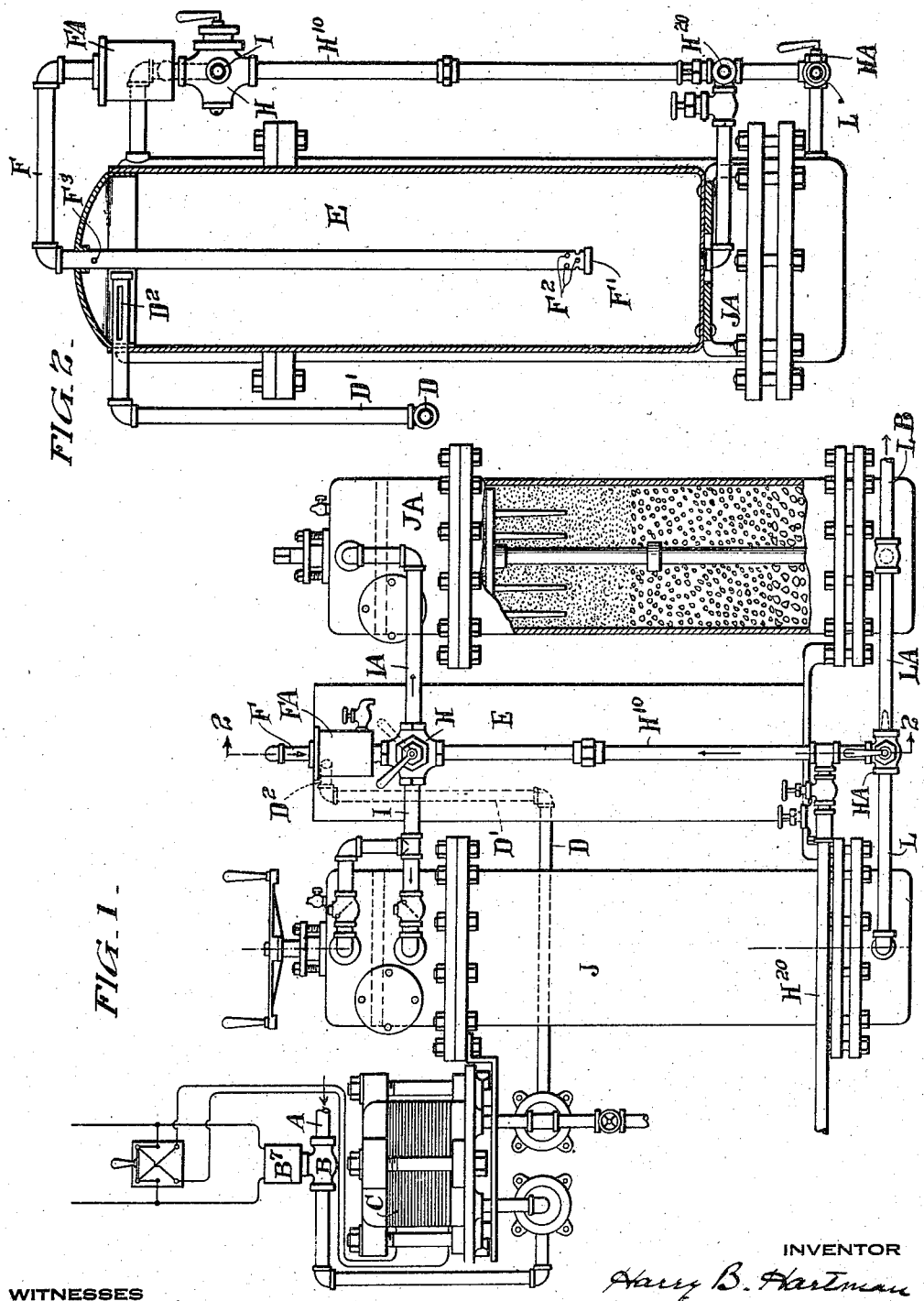
INVENTOR
Harry B. Hartman
BY
ATTORNEY
WITNESSES

UNITED STATES PATENT OFFICE.

HARRY B. HARTMAN, OF SCOTTDALE, PENNSYLVANIA, ASSIGNOR TO ELECTRIC WATER STERILIZER COMPANY, OF SCOTTDALE, PENNSYLVANIA, A CORPORATION OF PENNSYLVANIA.

WATER-PURIFYING APPARATUS.

1,139,970.   Specification of Letters Patent.   Patented May 18, 1915.

Original application filed August 12, 1913, Serial No. 784,300. Divided and this application filed June 11, 1914. Serial No. 844,403.

*To all whom it may concern:*

Be it known that I, HARRY B. HARTMAN, a citizen of the United States of America, residing in Scottdale, in the county of Westmoreland, in the State of Pennsylvania, have invented certain new and useful Improvements in Water-Purifying Apparatus, of which the following is a true and exact description, reference being had to the accompanying drawings, which form a part thereof.

My present invention consists in improved apparatus for purifying water in accordance with the general plan heretofore known, of first subjecting the water to electrolytic action and thereafter separating out of the water precipitated or suspended impurities.

The object of the invention is to provide simple and effective means for insuring a proper deposit on the filter bed of the coagulum resulting from the electrolytic action on the raw water. This I accomplish by the means which I employ for insuring a quiet flow into and out of the coagulating chamber employed, and the relative arrangements of the water inlet and outlet from said chamber.

The various features of novelty which characterize my invention are pointed out with particularity in the claims annexed to and forming a part of this specification.

For a better understanding of the invention, however, and of the advantages possessed by it, reference should be had to the accompanying drawings and descriptive matter in which I have illustrated and described a preferred form of apparatus embodying the invention.

Of the drawings: Figure 1 is a somewhat diagrammatic representation, with parts broken away and in section, of a portion of a water purifying plant embodying the present invention; and Fig. 2 is an elevation, partly in section, on the line 2—2 of Fig. 1.

In the portion of the particular form of water purifying plant with which the invention claimed herein is shown as employed in Fig. 1, A represents the raw water supply pipe leading to the electrode box C and controlled by the electrically operated valve B. The electrode box C in which the water is subjected to electrolytic action may well be, and is shown as being, of the same general construction as the electrode box disclosed and claimed in my prior Patent No. 1,065,361, granted June 24, 1913. Advantageously, though not necessarily, the energization of the electrode box and of the magnet $B^7$, by which the normally closed valve B is held open, is automatically brought about when, and only when, water is flowing through the plant, but no means for accomplishing this result are illustrated herein. From the outlet of the electrode box C the water passes through the pipe D and the branch pipe D' to the coagulation chamber E. As shown, the pipe D' terminates in a slotted end portion $D^2$ located within the chamber E at the upper end of the latter, and the slots in the end portion $D^2$ are so arranged as to insure a quiet and distributed flow of water into the upper end of the chamber E. From the chamber E the water passes through the pipe F, which, as shown, comprises a vertical portion passing through the top wall of the chamber E and extending down into the latter to a point adjacent but some distance above the lower end of the latter. The lower end of this portion of the pipe F is closed by cap F', and the pipe is formed with perforations $F^2$ adjacent the cap which insure a quiet and distributed flow of water from the lower portion of the coagulation chamber E into the pipe F. The pipe F in the construction shown is connected to the top of a small chamber FA, which in normal operation may be regarded as forming nothing more than a portion of the pipe F, but may receive chemical matter when the sand or granular material filters J and JA are being cleaned from time to time. $F^3$ represents an opening in the pipe F provided to limit the accumulation of air or gas in the coagulation chamber.

In normal operation, the water leaving the coagulation chamber E through the pipe F and chamber FA, is passed to the top of the filter J through the four-way valve H and pipe I, and after passing through the filter J is passed by the pipe L, three-way valve HA, pipe $H^{10}$, four-way valve H, and pipe LA to the top of the filter JA, and leaves the lower end of the latter through the service pipe LB. With the pipe connections and valves already referred to, and the valved waste connection $H^{20}$ to the pipe $H^{10}$, it is possible to cut either of the filters J and JA out of service, at will, or to obtain a reverse flow through either for cleaning purposes; but, as already explained, the water normally flows first through the filter J and then through the filter JA. The filters J and JA may well be similar in construction and of the usual type of granular filters employed in water purification plants of this general type.

The water purifying plant, shown in part in Fig. 1, is illustrated and described in detail in my prior application, Serial No. 784,300, filed August 12th, 1913, of which the present application is a division. In view of this fact, and the further fact that an adequate understanding of the invention claimed herein does not require a full knowledge of the details of the plant with which the invention may be used, further description herein of the apparatus shown by the drawings appears to be unnecessary.

The electrolytic action to which the raw water is subjected in passing through the electrode box C results in the formation of coagulum, and the efficiency of the purifying plant depends largely on the quiet and uniform manner in which coagulum is permitted to form in the chamber E, and is withdrawn from the latter and deposited at the top of the filter J in proportion to the rate of flow of the water being purified. The provisions made for insuring a quiet and even flow of water into the upper end of the coagulating chamber E and the quiet and distributed flow out of the latter from a level adjacent its lower end insure a fairly steady and uniform flow of coagulum out of the chamber E as well when the flow of water through the system is intermittent and irregular as when it is constant and fairly uniform. While there is a tendency for the coagulum to settle to the bottom of the chamber E with a corresponding clarification of the water in the upper portion of the chamber, this settling takes place slowly, and with commercial sizes and forms of the apparatus disclosed, will not carry the coagulum below the level of the lower end of the pipe F in a period of non-use as long as twelve hours or so. In consequence the coagulum will begin to flow out of the chamber E along with the water, at once when water is first drawn from the system after any period of non-use to which such apparatus will ordinarily be subject.

Having now described my invention, what I claim as new and desire to secure by Letters Patent, is:

1. In a water purifying system, the combination with means for electrolyzing the water treated, of a filter bed, a coagulation chamber, means for introducing the electrolyzed water into the upper end of said chamber, means for withdrawing water from said chamber at a level or levels adjacent but somewhat above its lower end, whereby coagulum resulting from the electrolytic action to which the water is subjected may be continuously admixed with water intermittently withdrawn from said chamber, notwithstanding the tendency of said coagulum to slowly settle to the bottom of said chamber, and means for passing the withdrawn water to said filter bed.

2. In a water purifying system, the combination with means for electrolyzing the water treated, of a filter bed, a coagulation chamber, means for introducing the electrolyzed water in distributed streams into the upper end of said chamber and means for withdrawing water from said chamber in distributed streams at a level or levels adjacent but somewhat above its lower end whereby coagulum resulting from the electrolytic action to which the water is subjected may be continuously admixed with water intermittently withdrawn from said chamber, notwithstanding the tendency of said coagulum to slowly settle to the bottom of said chamber, and means for passing the withdrawn water to the filter bed.

HARRY B. HARTMAN.

Witnesses:
W. S. WILEY,
NAT. E. SCHOTT.

Copies of this patent may be obtained for five cents each, by addressing the "Commissioner of Patents, Washington, D. C."